Patented July 6, 1948

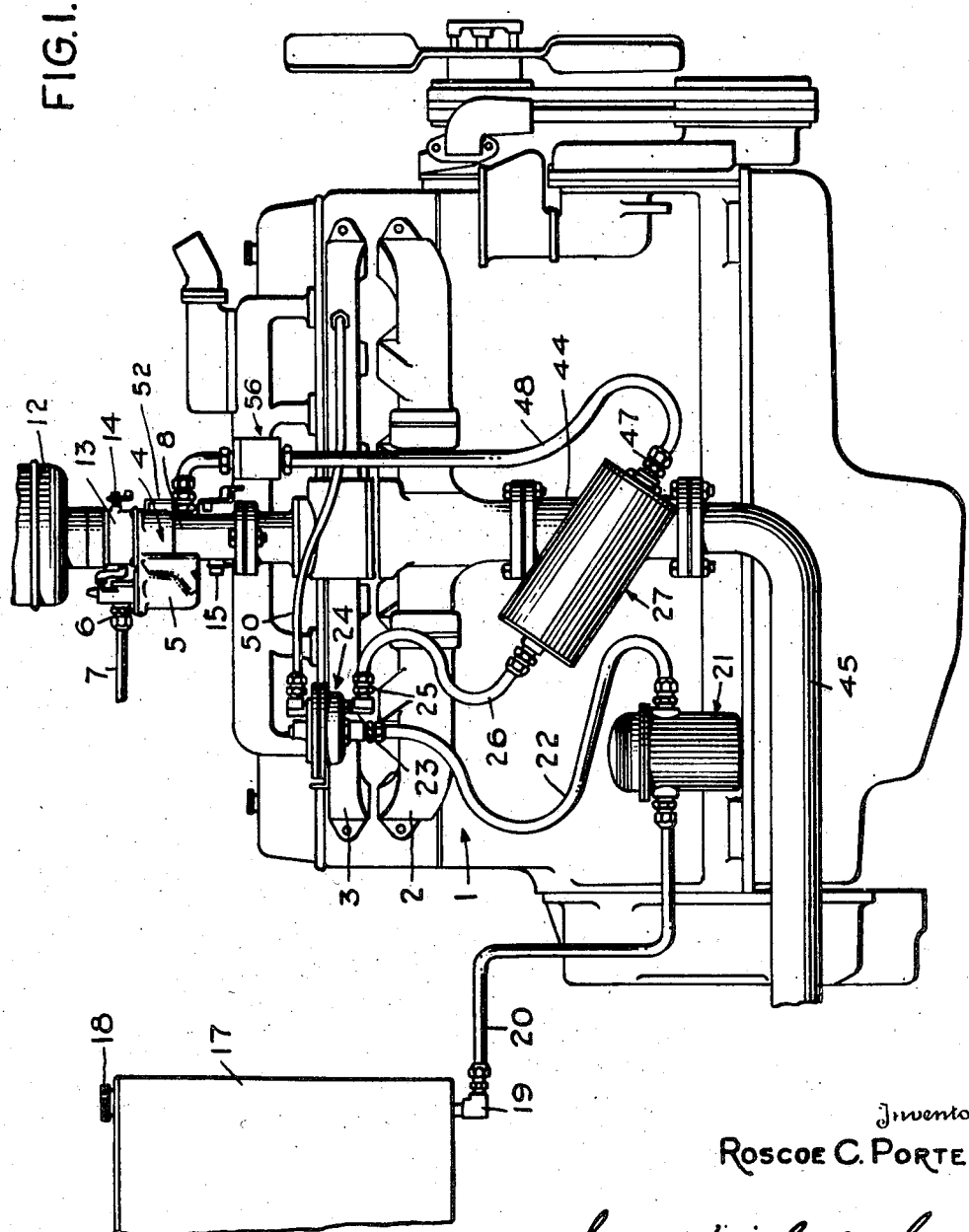

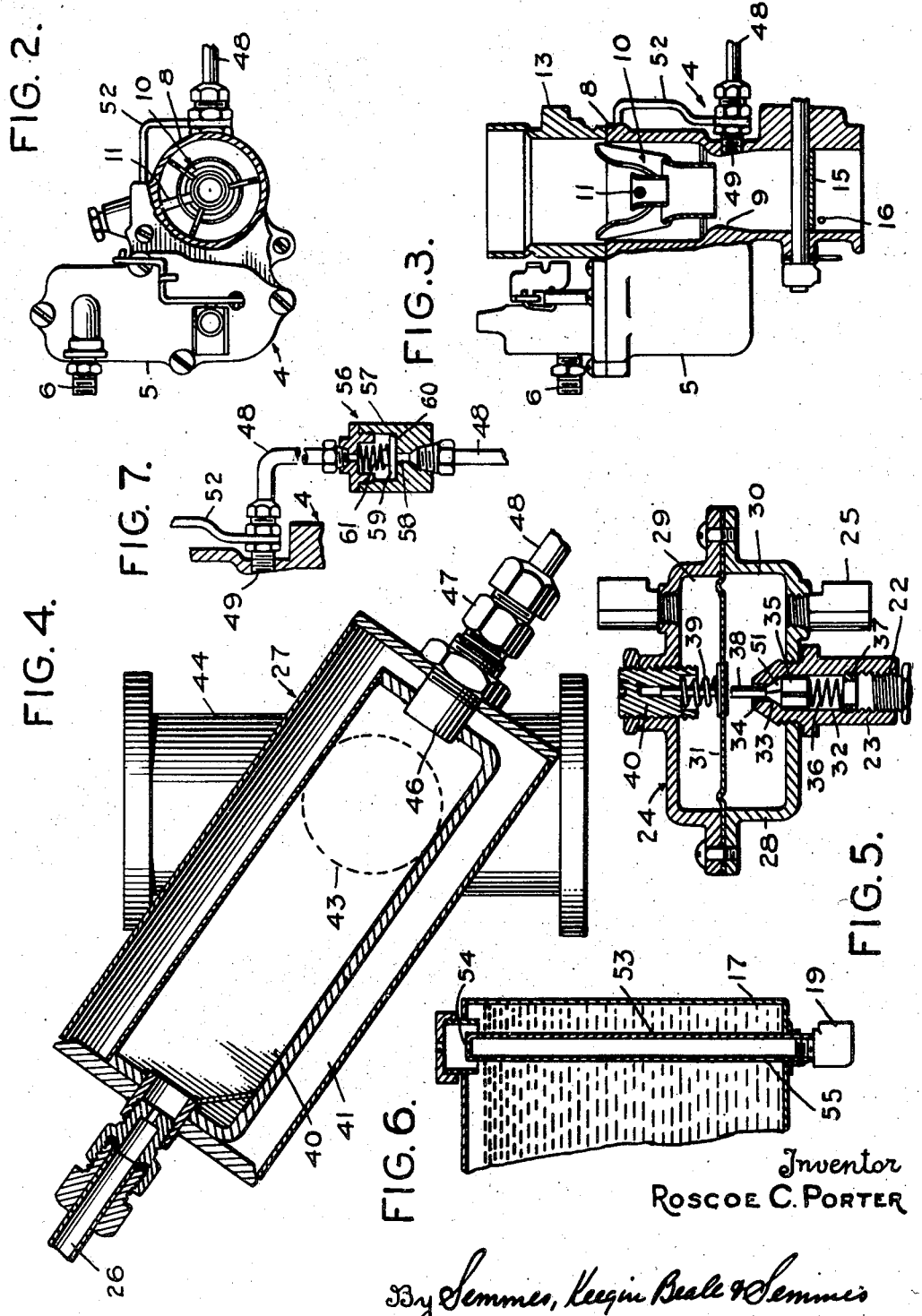

2,444,670

UNITED STATES PATENT OFFICE 2,444,670

METHOD AND APPARATUS FOR FORMING INTERNAL-COMBUSTION ENGINE FUEL CHARGES

Roscoe C. Porter, Arlington, Va., assignor, by mesne assignments, to The Briggs Filtration Company, Bethesda, Md., a corporation of Maryland Application October 23, 1944, Serial No. 559,922

17 Claims. (Cl. 123—25)

The present invention relates to the formation of fuel charges for internal combustion engines and more particularly to a method and apparatus for introducing aqueous fluid into the air-fuel mixture.

The use of water vapor as a detonation suppressor in internal combustion engines has long been known. In addition to reducing detonation, the introduction of water vapor to the cylinder charges produces other advantageous results, among them, a reduction in internal temperature of the high stressed parts of the engine, such as cylinder heads, pistons and rings, valves, etc., a lowering of carbon formation, oil sludging and plug fouling, and a lowering of oil consumption. It has also been found that the use of water in the fuel charge increases the horsepower of the engine and as a consequence permits the use of lower octane fuels in engines designed for higher octane fuels. In attempting to gain these advantages, water has been introduced at various points into the fuel induction system of internal combustion engines both as a liquid and as a vapor or steam. It has also been introduced as humidified intake air as the normal water vapor content of exhaust gases.

In addition to the advantages outlined above, we have noted still others. We have found that by intimately mixing definitely controlled amounts of hot water, heated water vapor, or steam with the liquid fuel charge in the mixing chamber of the carburetor and particularly at the point of maximum velocity and turbulence of the air stream, the heated fluid materially assists in vaporizing the whole fuel charge so that either with or without the usual "hot spot" vaporizing system, a more equal distribution of the charge to the various cylinders is accomplished.

The quantity of the heated moisture is small in proportion to the air charge and the temperature rise in the manifold therefore is small. We have found, however, that the heat carried by the moisture charge is sufficient to prevent freezing in the induction system.

To heat the water we prefer to utilize the hot exhaust gases from the engine and we have found that by definitely regulating the amount and flow of water to be heated in accordance with engine demands, we effect the optimum transfer of B. t. u's to the fuel charge.

This invention therefore has for its principal purpose to provide a method and apparatus for forming a fuel mixture for an internal combustion engine wherein water in amounts regulated by demands of the engine for a particular fuel used and, more, specifically, regulated by intake manifold pressures of the engine, is directed to a heating device and heated, preferably by exhaust gases from the engine. The heated aqueous fluid, either in the form of hot water, water vapor, or steam, depending upon desired results, is then intimately mixed with the liquid hydrocarbon charge and air in the induction system of the engine, preferably in a region of maximum velocity and turbulence of the air stream to assist in vaporizing the whole charge and supply aqueous fluid with the fuel mixture into the cylinders of the engine.

Another important object of the invention is to provide a method and apparatus of the above character wherein the water is supplied positively to the system to eliminate lag in the introduction of the heated fluid between idling and open throttle conditions of the engine.

Another object of the invention is to provide a method and apparatus of the above character which also provides a supply of moisture for the idling mixture.

Another object of the invention is to provide a method and apparatus of this character wherein the heating of the water is carried out in a region removed from the carburetor to avoid heating the same with a consequent loss of lighter fractions of the fuel.

With these and other objects in view, the invention consists in the parts and combinations, and the procedural steps hereinafter set forth, with the understanding that the necessary elements and the procedural steps employed in carrying the invention into effect may be varied without departing from the spirit of the invention.

To illustrate a means for carrying the invention into practical effect, a preferred type of apparatus is shown in the accompanying drawings applied to a spark ignition engine having a separated intake and exhaust manifold. It should be understood, however, that the invention is equally adaptable to engines employing the so-called "hot spot" fuel induction systems, and also that means other than the engine exhaust system, such as illustrated, may be employed for heating the water. Further, the invention is equally adapted for engines using either gasoline or heavier distillates, such as kerosene, for the fuel.

In the drawings.

Figure 1 is a view in side elevation of the conventional spark ignition engine incorporating the system for supplying moisture to the fuel mixture in accordance with this invention.

Figure 2 is a plan view, partly in section, of the carburetor.

Figure 3 is a side elevational view, partly in section, of the carburetor shown in Figure 2.

Figure 4 is a transverse sectional view through the chamber employed for heating the water.

Figure 5 is a transverse sectional view of the diaphragm valve for controlling the flow of the water from the pump to the heating chamber.

Figure 6 is a fragmental sectional view through the water tank showing one form of air bleed device which may be incorporated in the system for compensating the moisture component of the fuel charge.

Figure 7 is a transverse sectional view of a spring loaded valve in the conduit from the heater to the mixing chamber of the carburetor.

Referring more particularly to the drawings, there is shown in Figure 1 a conventional spark ignition engine 1, having an exhaust manifold 2 and an intake manifold 3 to which is attached a down draft carburetor 4. This carburetor is of conventional structure having a float chamber 5 supplied with fuel through a fitting 6 from a fuel supply line 7. The barrel 8 of the carburetor is formed with a main Venturi section 9 and secondary Venturi set, indicated generally as 10, and which communicates with the discharge end of the main fuel jet 11. The carburetor barrel is fitted at its upper end with an air strainer 12 connected with the carburetor through an inlet tube 13 which is provided with the usual choke valve assembly 14 (Figure 1). The lower end of the carburetor barrel is provided with a throttle valve 15 adjacent which is an idling jet 16. When the engine is operating, fuel is supplied to the float chamber in the usual manner through the line 7 connecting with the fuel pump of the engine (not shown). From the float chamber a metered supply enters the venturi 10 through the main jet 11 by the suction effect of the venturi to mix with air being drawn through the carburetor barrel.

To supply moisture to the air-fuel mixture in the carburetor in accordance with this invention, a water supply tank 17, provided with a vented filler cap 18 in its upper wall and an outlet fitting 19 in its lower wall, is located at any convenient place. The outlet fitting 19 connects through a pipe 20 with the input side of a pump 21.

This pump may be of any conventional type operated either by the engine 1 or by an auxiliary motor, but preferably delivering at a constant pressure. The type of pump illustrated in the drawings is an electrically operated diaphragm or similar pump, which, when operating, withdraws water from the tank 17 and discharges it at a constant pressure through a line 22 connecting the discharge side of the pump with an inlet fitting 23 of a diaphragm valve indicated generally as 24, and thence through a discharge fitting 25 and pipe line 26 to the input side of a water heater or steam generator 27.

The diaphragm valve 24, as best shown in Figure 5, consists of a split casing 28 divided into an upper compartment 29 and a lower compartment 30 by means of a flexible diaphragm 31. The fitting 23 communicates with the interior of the lower compartment 27 and is provided with an axial bore 32 forming a valve seat 33 and an inlet port 34 adapted to be opened and closed by a valve element 35 slidably mounted in the bore 32.

The valve element is urged toward its seat 33 by means of a light helical spring 36 interposed between the valve element and a hollow plug 37 threaded into the bore 32. Formed on the valve element 35 is an axial projection 38 which extends through the inlet port to adjacent the lower surface of the flexible diaphragm 31.

Normally urging the diaphragm 31 downwardly toward the valve element 35 is a compression spring 39 interposed between the upper surface of the diaphragm and a spring seat 40 adjustably secured in the upper wall of the casing 28. This spring 39 has a compression force exceeding that of the spring 36 so that normally the diaphragm is flexed downwardly to engage the projection 38 and move the valve element off its seat and maintain the inlet port open.

The heater or steam generator 27 is best shown in Figure 4 and consists essentially of an inner chamber 40, with which the pipe line 26 communicates, and an outer chamber 41 completely enveloping the inner chamber. The outer chamber 41 connects, through an aperture 43 in the wall thereof, with a flanged coupling element 44 interposed in the exhaust system of the engine, preferably between the exhaust manifold 2 and exhaust pipe 45. By this arrangement a portion of the exhaust gases will be diverted into the outer chamber 41. Any convenient and well known means such as a thermally controlled deflecting flap or valve may, if desired, be employed to control the flow of exhaust gases into the chamber 41 and control thereby the heat transmitted. For most conditions of operation, however, it is desirable that the heater be maintained above the boiling point of water and function as a steam generator.

The heater 27 is preferably arranged so that at least its inner chamber 40 is inclined to the horizontal with its input end above its discharge end so that water will flow down the inclined hot lower wall in a relatively thin stream to effect rapid vaporization. The lower end of the chamber is fitted with a discharge tube 46 to which is connected, by means of a fitting 47, one end of a pipe line 48. The opposite end of this line is connected to a fitting or nozzle 49 threaded into the barrel 8 of the carburetor and communicating with the mixing chamber preferably adjacent the restricted portion of the main venturi 9.

Moisture is desirable for mixture with the fuel charge during periods of acceleration of the engine or when the engine is operating under heavy loads, in other words, when the throttle valve 15 is open. To control the flow of water to the heating chamber 41 and as a consequence, the flow of steam or moisture to the mixing chamber of the carburetor, in accordance with the operating conditions of the engine, advantage is taken of changes in intake manifold pressure due to positions of the throttle valve 15. To effect this flow control, the upper chamber 29 of the valve 24 is connected through a line 50 with the intake manifold 3. As stated above, the spring 39 normally urges the diaphragm 31 in a direction to urge the valve 35 to open the inlet port 34 and permit a flow of water through the valve. This condition maintains when intake manifold pressures are high, that is, during open positions of the throttle 15. When the throttle valve is closed, however, a high vacuum is produced in the intake manifold, and, through the line 50, the upper chamber 29 of the valve. This differential in pressure between the upper and lower chambers of the valve reacting on the diaphragm 31 draws the diaphragm upwardly, compressing the spring and permitting the lighter spring 36 to move the valve 35 upwardly to close the inlet port 34 and restrict the flow of water to the heater 27 and as a consequence the supply of steam. The manifold pressure at which the valve opens may be easily and accurately controlled by the axially adjustable spring seat 40 which may be screwed toward or away from the spring 39 to vary its compression force, and, as a consequence, the degree of vacuum or suction force necessary to move the diaphragm sufficiently to permit the valve to close.

By this means, when the valve 24 is open, moisture or steam will be introduced into the barrel of the carburetor partly by the pressure in the heating chamber 40 due to displacement by the introduced water and by expansion in the chamber, and partly by the suction effect of the venturi 9. This heated water vapor or steam mixes intimately with the fuel discharged through the main jet 11 and atomized by the high velocity air stream flowing therethrough; its heat assists in vaporizing the fuel and, with the moisture provided, produces an optimum mixture.

As stated, the valve 24 is open only during open positions of the throttle valve 15, while during idling periods, when the throttle is closed, the valve 24 is closed. It is desirable, however, when the engine is idling and the valve 24 closed, to supply a small quantity of steam to the idling charge by permittig a small quantity of water to by-pass the closed valve. This may be accomplished by a number of by-pass arrangements, one simple means, as shown in Figure 5, being a small groove 51 in the face of the valve element 35 so that when the valve face engages its seat 33, a restricted flow passage is provided. Therefore, when the valve is closed, a restricted flow of water passes, as did the main flow, into the heating chamber 40, is vaporized and passes as moisture or steam through the pipe line 48 to the carburetor. To direct this steam to mix with the idling charge, a small tube 52 communicates at one end with the line 48, preferably by a suitable connection with the nozzle element 49, and has its other end connecting into the system of idle fuel passageways as indicated in Figure 2.

During idling there is little or no suction created in the venturi of the carburetor. On the other hand, a high suction is created in the region of the discharge of the idling jet 16 into the mixing chamber due to the high velocity of air flowing through the restricted space between the edge of the throttle valve 15 and the wall of the carburetor barrel. Thus, instead of the steam being discharged, as before, through the nozzle 48, it is drawn through the tube 52 and into the idle fuel passage to mix with the idling fuel and be discharged therewith into the mixing chamber of the carburetor, where, as in the case of the main charge, its heat assists in vaporizing the fuel and its moisture improves the fuel mixture.

Under some conditions and with certain types of carburetors it may be desirable in addition to compensating the fuel charge as normally performed, to also compensate the moisture component of the mixture. This additional compensation may take place conveniently in the tank 17, in accordance with withdrawal therefrom, by a suitable compensating device such as shown in Fig. 6. This compensating device may consist of a vertical tube or well 53 having its lower or discharge end connected with the outlet fitting 19 and its upper end open to the atmosphere in the head space of the tank through an orifice 54. At a suitable point in its length, the tube 53 is provided with an orifice 55 of calculated size to connect the tube with the water supply in the tank.

The size and position of the orifice 55 is so calculated that during engine operations requiring moisture, that is, load conditions of low speed but open throttle where the suction of the pump plus the suction of the venturi through the pump is such that only water will be withdrawn from the tank through the orifice 55. On the other hand, when the engine speeds up past the knocking range with a consequent increase in venturi suction, the hydrostatic head in the tube 53 will lower the liquid to the orifice 55 to "lean out" the water charge.

As described above, the pump 21 functions to deliver water from the tank 17 to the heater 27, which action is assisted by the carburetor suction on the line 49. In some engines, particularly those having four or less cylinders per carburetor where suction in the carburetor venturi is subject to extreme pulsations it may be desirable to interpose a sampling valve arrangement in the line 49 as shown in Figure 7. This may be a simple one-way valve 56 consisting of a casing 57 forming a flow passage 58 controlled by a valve element 59 to open in the direction of flow of the fluid from the heater to the carburetor. The valve element 59 is normally urged toward its seat 60 by a relatively light compression spring 61 but is lifted off its seat by suction created by the venturi 9 acting against the force of the spring. This valve not only assists in supplying moisture to the fuel charge in accordance with the carburetor suction but in addition prevents any blow back through the line 49 which may take place due to poor valve timing in the engine.

From the foregoing description it will be seen that during all conditions of operation, since the moisture is positively supplied to the fuel charge, or in other words since the water is supplied to the heating chamber under pressure and independently of variations in engine operation, moisture is always instantly available and in adequate quantities for the fuel mixture.

I claim:

1. A method of forming the fuel charge for an internal combustion engine comprising introducing liquid hydrocarbon into the main air stream in the induction system of said engine, positively introducing heated aqueous fluid into said air stream concurrently with the liquid hydrocarbon, and controlling the introduction of the aqueous fluid in accordance with changes in pressure in the intake manifold of said engine whereby the aqueous fluid will be introduced when the pressure in the intake manifold of the engine is high.

2. A method of forming the fuel charge for an internal combustion engine comprising introducing liquid hydrocarbon into the main air stream in the induction system of said engine, introducing positively steam into said air stream, and controlling the introduction of said steam in accordance with changes in pressure in the intake manifold of said engine whereby the aqueous fluid will be introduced when the pressure in the intake manifold of the engine is high.

3. A method of forming the fuel charge for an internal combustion engine comprising introducing liquid hydrocarbon into the main air stream in the induction system of said engine, passing water first to a heating step, controlling the flow of water to the heating step in accordance with changes in intake manifold pressure of the engine whereby the aqueous fluid will be introduced when the pressure in the intake manifold of the engine is high, and introducing aqueous fluid from the heating step into said air stream concurrently with the introduction of liquid hydrocarbon.

4. A method of forming the fuel charge for an internal combustion engine comprising introducing liquid hydrocarbon into the main air stream in the induction system of said engine, passing water into heat exchange relation with exhaust gases from said engine to generate steam, controlling the flow of water in accordance with changes in pressure in the intake manifold of said engine whereby the aqueous fluid will be introduced when the pressure in the intake manifold of the engine is high, and introducing the steam into said air stream.

5. A method of forming the fuel charge for an internal combustion engine comprising introducing liquid hydrocarbon into the main air stream in the induction system of said engine, passing water under pressure into heat exchange relation with exhaust gases from said engine to generate steam, controlling the flow of water in accordance with changes in pressure in the intake manifold of said engine whereby the aqueous fluid will be introduced when the pressure in the intake manifold of the engine is high, and introducing the steam into said air stream.

6. A method of forming the fuel charge for an internal combustion engine having a carburetor, comprising introducing liquid hydrocarbon into the mixing chamber of said carburetor, passing water under pressure to a heating zone removed from said carburetor, generating steam in said zone, and introducing the steam into said mixing chamber adjacent the point of introduction thereinto of the liquid hydrocarbon.

7. A method of forming the fuel charge for an internal combustion engine comprising introducing liquid hydrocarbon into the main air stream in the induction system of said engine, passing water into heat exchange relation with exhaust gases from said engine to generate steam, introducing the steam into said air stream, and bleeding air into said water prior to the generation of said steam to compensate the steam component of the fuel charge.

8. A method of forming the fuel charge for an internal combustion engine equipped with a carburetor having a main fuel system and an idling fuel system for supplying liquid fuel for the fuel mixture comprising passing water to a heating zone, controlling the passage of additional water to said zone by changes in pressure in the intake manifold of said engine, heating the water in said zone, and introducing heated aqueous fluid therefrom into the fuel mixture in accordance with the suction effect respectively of said systems.

9. In an internal combustion engine having an intake manifold and a carburetor, a source of water, a heating chamber, pressure means for introducing water from said source to the heating chamber, conduit means connecting the heating chamber with the mixing chamber of the carburetor for supplying heated aqueous fluid into said mixing chamber, means responsive to changes in intake manifold pressure for controlling the introduction of water to the heating chamber whereby the aqueous fluid will be introduced when the pressure in the intake manifold of the engine is high, and means for heating said heating chamber.

10. In an internal combustion engine having an intake manifold and a carburetor, a source of water, a heating chamber, pressure means for introducing water from said source to the heating chamber, conduit means connecting the heating chamber with the mixing chamber of the carburetor for supplying heated aqueous fluid into said mixing chamber, means responsive to changes in intake manifold pressure for controlling the introduction of water to the heating chamber whereby the aqueous fluid will be introduced when the pressure in the intake manifold of the engine is high, conduit means connecting the heating chamber with the exhaust system of said engine for by-passing exhaust gases therefrom to heat said chamber, and thermal responsive means for controlling the passage of the exhaust gases to said heating chamber.

11. In an internal combustion engine having an intake manifold and a carburetor, a source of water, a heating chamber, means including a constant pressure pump for delivering water from said source to the heating chamber, conduit means connecting the heating chamber with the mixing chamber of the carburetor for supplying heated aqueous fluid from the heating chamber to the mixing chamber, a diaphragm actuated valve associated with said pump, said valve being responsive to changes in intake manifold pressure whereby water is delivered to the heating chamber during periods of high manifold pressure, and means for heating said chamber.

12. In an internal combustion engine having an intake manifold and a carburetor, a source of water, a steam generator having an elongated inner chamber and an outer chamber surrounding the same, at least the inner chamber being inclined to the horizontal, a constant pressure pump having its input side communicating with the source of water and its discharge side communicating with the higher end of the inclined inner chamber, whereby water discharged by said pump will flow down the inclined wall of said inner chamber, means for circulating exhaust gases from the engine through the outer chamber to heat the walls of said inner chamber, and conduit means connecting the lower end of said inner chamber with the mixing chamber of said carburetor for delivering steam thereto.

13. In an internal combustion engine having an intake manifold and a carburetor, a source of water, a steam generator positioned in a region removed from said carburetor and having an inner and an outer chamber, a constant pressure pump having its input side communicating with said source of water and its discharge side communicating with said inner chamber, conduit means connecting the inner chamber with the mixing chamber of said carburetor, valve means responsive to changes in intake manifold pressure for controlling the discharge of water from said pump to said inner chamber, and means for circulating hot exhaust gases from said engine through the outer chamber of said steam generator.

14. Apparatus for forming the fuel charge for an internal combustion engine comprising a carburetor having a main fuel system and an idling fuel system, a source of water, a heating chamber, means for heating the same, means including a constant pressure pump for delivering water from said source to the heating chamber, valve means associated with the discharge side of said pump and responsive to the changes in intake manifold pressure for controlling the delivery of water to the heating chamber, and conduit means connecting the heating chamber with each of said fuel systems whereby heated aqueous fluid will be introduced respectively to each fuel system in accordance with the suction effect thereof.

15. In an internal combustion engine having an intake manifold and a carburetor, a source of water, a heating chamber, pressure means for introducing water from said source to the heating chamber, conduit means connecting the heating chamber with the mixing chamber of the carburetor for supplying heated aqueous fluid into said mixing chamber, means responsive to changes in intake manifold pressure for controlling the introduction of water to the heating chamber, and valve means interposed in said conduit and responsive to the Venturi effect of said carburetor for controlling the flow through said conduit.

16. In an internal combustion engine having an intake manifold and a carburetor, a source of water, a heating chamber, pressure means for introducing water from said source to the heating chamber, conduit means connecting the heating chamber with the mixing chamber of the carburetor for supplying heated aqueous fluid into said mixing chamber, means responsive to changes in intake manifold pressure for controlling the introduction of water to the heating chamber, and resiliently loaded one-way valve means interposed in said conduit opening in the direction of flow therethrough in accordance with Venturi suction of said carburetor for controlling flow through said conduit.

17. Apparatus for forming the fuel charge of an internal combustion engine comprising a carburetor, a source of water, a flash heater, a conduit for delivering water to the heater, a pump for moving water through the conduit, a diaphragm valve responsive to the intake manifold pressure controlling the flow of water to the heater whereby flow is permitted when the intake manifold pressure is high, and conduit means connecting the heater with the mixing chamber of the carburetor.

ROSCOE C. PORTER.

REFERENCES CITED

The following references are of record in the file of this patent:

UNITED STATES PATENTS

| Number | Name | Date |
| --- | --- | --- |
| 1,077,881 | Higgins | Nov. 4, 1913 |
| 1,205,658 | Pazandak | Nov. 21, 1916 |
| 1,274,233 | Bellion | July 30, 1918 |
| 1,278,900 | Fleak et al. | Sept. 17, 1918 |
| 1,467,333 | Riege | Sept. 11, 1923 |
| 1,491,376 | Bochet | Apr. 22, 1924 |
| 1,497,533 | Barron | June 10, 1924 |
| 1,504,018 | Berard | Aug. 5, 1924 |
| 1,509,426 | Gregg, Jr. | Sept. 23, 1924 |
| 1,515,250 | Gemino et al. | Nov. 11, 1924 |
| 1,522,177 | Chapman | Jan. 6, 1925 |
| 1,529,121 | Fausett | Mar. 10, 1925 |
| 1,550,967 | Kelty | Aug. 25, 1925 |
| 1,578,216 | Stutika | Mar. 23, 1926 |
| 1,590,677 | Falcon | June 29, 1926 |
| 1,627,139 | Bertschy | May 3, 1927 |
| 2,076,606 | Winter | Apr. 13, 1937 |
| 2,188,175 | Condon | Jan. 23, 1940 |